US009310806B2

United States Patent
Romanov et al.

(10) Patent No.: US 9,310,806 B2
(45) Date of Patent: Apr. 12, 2016

(54) SYSTEM FOR LOCALIZATION AND OBSTACLE DETECTION USING A COMMON RECEIVER

(75) Inventors: Nikolai Romanov, Oak Park, CA (US); James Philip Case, Los Angeles, CA (US); Michael Dooley, Pasadena, CA (US)

(73) Assignee: iRobot Corporation, Bedford, MA (US)

( * ) Notice: Subject to any disclaimer, the term of this patent is extended or adjusted under 35 U.S.C. 154(b) by 1162 days.

(21) Appl. No.: 12/985,194

(22) Filed: Jan. 5, 2011

(65) Prior Publication Data

US 2011/0166707 A1 Jul. 7, 2011

Related U.S. Application Data

(60) Provisional application No. 61/292,757, filed on Jan. 6, 2010.

(51) Int. Cl.
*G01S 5/16* (2006.01)
*G05D 1/02* (2006.01)

(52) U.S. Cl.
CPC .............. *G05D 1/0242* (2013.01); *G01S 5/16* (2013.01); *G05D 2201/0203* (2013.01)

(58) Field of Classification Search
CPC . G05D 1/0242; G05D 1/0231; G05D 1/0238; G05D 1/024; G01S 5/163; G01S 17/48; G01S 17/06; G01C 3/06; B25J 13/086; B25J 13/087; B25J 13/08; B25J 13/088; B25J 13/089
USPC ...................................... 318/568.16; 700/258
See application file for complete search history.

(56) References Cited

U.S. PATENT DOCUMENTS 4,710,020 A 12/1987 Maddox et al.
4,815,840 A * 3/1989 Benayad-Cherif ....... G01S 1/70
180/168

(Continued)

FOREIGN PATENT DOCUMENTS

DE 4338841 A1 5/1995
EP 0294101 A 12/1988

(Continued)

OTHER PUBLICATIONS

Becker, C.; Salas, J.; Tokusei, K.; Latombe, J.-C.; .: "Reliable navigation using landmarks," Robotics and Automation, 1995. Proceedings, 1995 IEEE International Conference on Robotics and Automation, vol. 1, 21-27, May 21-27, 1995 pp. 401-406, vol. 1.

(Continued)

*Primary Examiner* — Stephen Holwerda
(74) *Attorney, Agent, or Firm* — Knobbe, Martens, Olson & Bear, LLP

(57) ABSTRACT

A localization and obstacle detection system includes a first signal projector configured to project a first signal into an environment and a robot configured to move in the environment. The robot includes a second signal projector configured to project a second signal into the environment; a signal receiver configured to receive the first signal and the second signal; a localizer configured to determine a location of the robot in the environment based at least in part on the received first signal; and a detector configured to determine the presence of an obstacle in the environment based at least in part on the intensity and bearing of the received second signal and without touching the obstacle; wherein the second signal is distinct from the first signal in at least one characteristic.

30 Claims, 6 Drawing Sheets

(56) References Cited

U.S. PATENT DOCUMENTS

| | | |
|---|---|---|
| 4,846,297 A | 7/1989 | Field et al. |
| 5,002,501 A | 3/1991 | Tucker |
| 5,155,684 A | 10/1992 | Burke et al. |
| 5,258,822 A | 11/1993 | Nakamura et al. |
| 5,844,232 A | 12/1998 | Pezant |
| 5,940,170 A | 8/1999 | Berg et al. |
| 6,278,917 B1 | 8/2001 | Bauer et al. |
| 6,389,329 B1* | 5/2002 | Colens ............... A47L 5/30 180/167 |
| 6,459,955 B1 | 10/2002 | Bartsch et al. |
| 6,504,610 B1 | 1/2003 | Bauer et al. |
| 6,629,028 B2 | 9/2003 | Paromtchik et al. |
| 6,654,482 B1 | 11/2003 | Parent et al. |
| 6,687,571 B1 | 2/2004 | Byrne et al. |
| 6,906,702 B1 | 6/2005 | Tanaka et al. |
| 7,069,124 B1 | 6/2006 | Whittaker et al. |
| 7,075,661 B2 | 7/2006 | Petty et al. |
| 7,720,554 B2 | 5/2010 | DiBernardo et al. |
| 2001/0013929 A1 | 8/2001 | Torsten |
| 2002/0016649 A1 | 2/2002 | Jones |
| 2002/0104963 A1 | 8/2002 | Mancevski |
| 2002/0159051 A1 | 10/2002 | Guo |
| 2003/0058262 A1 | 3/2003 | Sato et al. |
| 2003/0193657 A1 | 10/2003 | Uomori et al. |
| 2003/0208304 A1 | 11/2003 | Peless et al. |
| 2003/0233870 A1 | 12/2003 | Mancevski |
| 2004/0125461 A1 | 7/2004 | Kawamura |
| 2004/0168148 A1 | 8/2004 | Goncalves et al. |
| 2005/0000543 A1 | 1/2005 | Taylor et al. |
| 2005/0007057 A1* | 1/2005 | Peless ............... A01D 34/008 318/580 |
| 2005/0010330 A1* | 1/2005 | Abramson ............ G05D 1/0225 700/245 |
| 2005/0033124 A1 | 2/2005 | Kelly et al. |
| 2005/0213082 A1* | 9/2005 | DiBernardo ............ G01S 5/163 356/139.03 |
| 2005/0213109 A1 | 9/2005 | Schell et al. |
| 2005/0289527 A1 | 12/2005 | Illowsky et al. |
| 2006/0095169 A1 | 5/2006 | Minor et al. |
| 2007/0097832 A1 | 5/2007 | Koivisto et al. |
| 2007/0156286 A1* | 7/2007 | Yamauchi ............ G05D 1/0038 700/245 |
| 2007/0179670 A1* | 8/2007 | Chiappetta ........... G05D 1/0272 700/245 |
| 2007/0234492 A1 | 10/2007 | Svendsen et al. |
| 2007/0244610 A1* | 10/2007 | Ozick ...................... A47L 5/30 701/23 |
| 2007/0271011 A1* | 11/2007 | Lee ..................... G05D 1/0242 700/245 |
| 2008/0009965 A1 | 1/2008 | Bruemmer et al. |
| 2008/0012518 A1* | 1/2008 | Yamamoto ........... G05D 1/0225 318/568.12 |
| 2008/0133052 A1 | 6/2008 | Jones et al. |
| 2008/0276407 A1 | 11/2008 | Schnittman et al. |
| 2009/0081923 A1* | 3/2009 | Dooley .................. A63F 9/143 446/456 |

FOREIGN PATENT DOCUMENTS

| | | |
|---|---|---|
| EP | 0479273 A | 4/1992 |
| EP | 0 798 567 | 10/1997 |
| FR | 2601443 A | 1/1998 |
| GB | 2284957 A | 6/1995 |
| JP | 59112311 A | 6/1984 |
| JP | 59184917 A | 10/1984 |
| JP | 60089213 A | 5/1985 |
| JP | 05257527 A | 10/1993 |
| JP | 05285861 A1 | 11/1993 |
| JP | 10-27018 | 1/1998 |
| JP | 2001-522079 | 11/2001 |
| JP | 2002-82720 | 3/2002 |
| JP | 2003-515210 | 4/2003 |
| WO | WO 99/23543 | 5/1999 |
| WO | WO 01/37060 | 5/2001 |

OTHER PUBLICATIONS

International Search Report for PCT/US05/010200, dated Aug. 2, 2005.

International Search Report for PCT/US05/010244, dated Aug. 2, 2005.

Japanese Office Action, JP Patent Application No. 2007-506413, dated May 26, 2010, English Translation and Japanese Office Action.

* cited by examiner

SYSTEM FOR LOCALIZATION AND OBSTACLE DETECTION USING A COMMON RECEIVER

CROSS-REFERENCE TO RELATED APPLICATIONS

This application claims the benefit under 35 U.S.C. §119(e) of U.S. Provisional Application No. 61/292,757, filed Jan. 6, 2010, the entirety of which is hereby incorporated by reference.

BACKGROUND

1. Field

What is disclosed herein relates to detecting obstacles and determining location in an environment.

2. Description of the Related Art

It is often necessary or useful to determine when obstacles are proximate or likely proximate to the location of a mobile device in an environment. It is also often necessary or useful to determine the location of such a mobile device in an environment. Certain systems and methods for detecting or imputing the presence of obstacles are known, as are systems and methods for determining the location of a mobile device. However, mobile device with both obstacle detection and localization often have distinct and onerous hardware and computational resource requirements and often involve the application of different technologies and algorithms.

SUMMARY

Certain embodiments discussed in this application may be utilized in conjunction with systems and methods disclosed in U.S. Pat. No. 7,720,554, filed on Mar. 25, 2005, the content of which is hereby incorporated herein in its entirety by reference.

Certain embodiments include a mobile device optionally comprising one or more signal sources (such as light sources) integrated or on-board. Optionally, in addition or instead, the mobile device is configured to receive signals from sources placed off-board in the mobile device's operating environment. The example mobile device also comprises a receiver, such as one comprising one or more photo-detectors or other detector or sensor configured to detect signals from the signal source(s). A processor (which may be included in the mobile device or which may be remote from the mobile device) is configured to perform localization and obstacle detection.

To perform localization, the example mobile device may measure the location of stationary localized reflections from external signal sources (such as lights) projected onto, for example, a ceiling or other surface (to create 'spots'). Using such measurements, the mobile device may determine its position with respect to a stationary reference frame. To perform obstacle detection, the example mobile device may measure the distribution of reflections of signals (e.g., light) projected by the on-board signal sources. Both the localization procedure and obstacle detection procedure may optionally employ a common receiver configured to collect signals (e.g., light) from on-board and off-board sources and to distinguish the components of the combined signal to identify the components from the on-board and off-board sources based upon their respective modulations or other distinguishing properties.

BRIEF DESCRIPTION OF THE DRAWINGS

The disclosed aspects will hereinafter be described in conjunction with the appended drawings, which are provided to illustrate and not to limit the disclosed aspects. Like designations denote like elements.

DETAILED DESCRIPTION OF PREFERRED EMBODIMENTS

Generally

Figure 1:
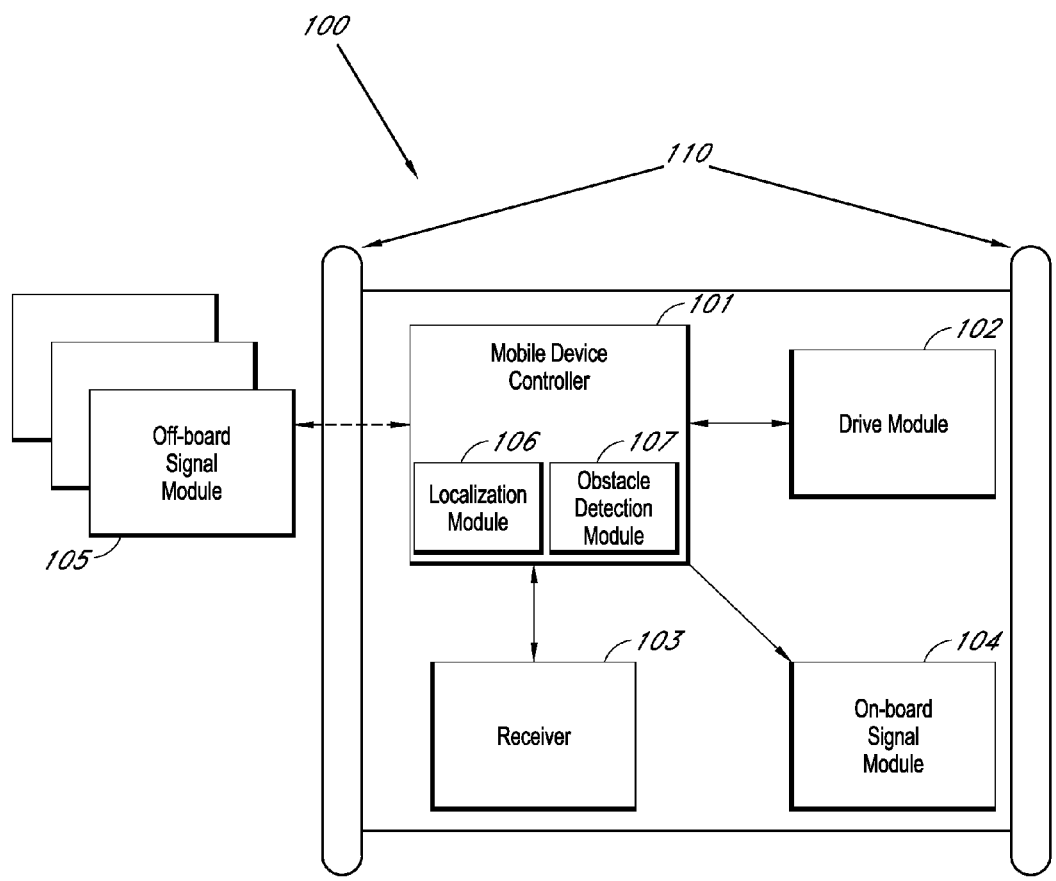
FIG. 1 illustrates an example collection of components for an example embodiment of a system configured to allow a mobile object to both localize and detect obstacles based on signals received at a single on-board receiver.

Described herein are methods and systems for localizing an object while detecting obstacles. Certain embodiments may localize and obstacle detect using multiple instances of a single signal type (e.g., multiple instances of infrared light signals, the instances having different amplitudes or frequencies) which, after being emitted into the environment of the object, are detected by a common receiver on-board the object.

Certain example methods and systems disclosed herein disclose a device that can use a single receiver to monitor both localization and obstacle detection signals, disambiguate the two types of signals, localize using the localization signals, and detect obstacles using the obstacle detection signals. Certain embodiments may include separate receivers for monitoring localization signals and obstacle detection signals, respectively.

An example mobile device configured in accordance with certain example methods and systems disclosed herein adapts to the presence of obstacles while localizing. Certain embodiments anticipate the presence of obstacles based at least in part on detecting that the mobile device is beneath an object. Certain example embodiments integrate a localization system as described in U.S. Pat. No. 7,720,554 (enabling the measuring of the absolute location of a mobile device in an environment) with an obstacle detection system such that only a common receiver is required, optionally a single common receiver.

Some disclosed embodiments can optionally achieve these results while using relatively inexpensive amounts of computational resources such as processing power, storage, and time, such that the functionality disclosed herein can be made available in a relatively compact mobile device and/or it can be distributed in affordable mass market consumer goods, including products which perform additional functionality beyond navigating.

The systems and methods described herein can advantageously be implemented using computer software, hardware, firmware, or any combination of software, hardware, and firmware, including virtualized or virtual hardware. In an example embodiment, a system is implemented as a number of software modules that comprise computer executable code for performing the functions described herein. In an example embodiment, the computer-executable code is executed on one or more general purpose computers or processors. However, any module that can be implemented using software to be executed on a general purpose computer or processor can also be implemented using a different combination of hardware, software, or firmware. For example, such a module can be implemented completely in hardware using a combination of integrated circuits. Alternatively or additionally, such a module can be implemented completely or partially using specialized computers or processors designed to perform the particular functions described herein rather than by general purpose computers.

The modules, controllers, and other components described herein can be combined or divided. For example, any two or more modules can be combined into one module. Thus, referring to FIG. 1, the localization module 106 and the obstacle detection module 107 can be combined into a single module that performs the functions of both modules and that one, both, or a combined module may be independent of the mobile device controller 101 or implemented as part of the mobile device controller 101. Conversely, any one module can be divided into multiple modules. For example, the drive module 102 can be divided into multiple modules such that each individual module performs part of the functions of the drive module 102 and all of the modules collectively perform all such functions.

Multiple distributed computing devices can be substituted for any one computing device illustrated herein. In such distributed embodiments, the functions of the one computing device are distributed such that some functions are performed on each of the distributed computing devices.

The foregoing and other variations understood by a skilled artisan can be made to the embodiments described herein without departing from what is disclosed herein. With the understanding therefore, that the described embodiments are illustrative and that the system and methods are not limited to the described embodiments, certain embodiments are described below with reference to certain figures.

Definitions

Through the description herein, "localization" may include determining both the location of an object in an environment and the orientation of that object. A combination of location and orientation is referred to as a "pose".

For convenience, much of this disclosure is expressed in terms of a "mobile device" or a "mobile object". However, the disclosed aspects may generally be used to navigate any type of objects, and one of skill in the art will understand how the disclosure can be applied to other objects, for example, those that are not independently mobile (such as those that are transported or carried by something else). By way of illustration and not limitation, a mobile device may be an autonomous, semiautonomous, or remotely directed floor cleaner (e.g., a sweeper, a vacuum, a lawn mower, and/or a mopper), delivery vehicle (e.g., that delivers mail in a building, food in a hospital or dormitory, etc.), or monitoring vehicle (e.g., pollution or contaminant detector, security monitor), equipped with one or more drive motors which drive one or more wheels, tracks, or other such devices, where the drive motors may be under control of a computing device executing a program stored in non-transitory memory (e.g., it persists when the object is powered down or when some other data is overwritten or erased).

A mobile device may be configured to navigate for the sake of navigation, or it may be configured to perform additional tasks, including without limitation those referenced above, as well as recoding locally and/or streaming to a remote device (video, audio, and or other data), mopping, trimming, and dispensing (e.g., paint, sealant, seeds, fertilizer, or pool cleaner). A mobile device may be a robot configured to perform any of these functions and/or other functions. In sum, "mobile object" and "mobile device" are broad terms and are to be given their ordinary and customary meaning to a person of ordinary skill in the art (i.e., they are not to be limited to a special or customized meaning) and include, without limitation, the examples mentioned above.

"Navigate" is a broad term and is to be given its ordinary and customary meaning to a person of ordinary skill in the art (i.e., it is not to be limited to a special or customized meaning) and includes, without limitation, determining a route, such as a route from a source location to a destination location, and moving in an environment ("traversing" that environment) in accordance with that route. Navigation may be performed, without limitation, by moving on wheels or tracks or the like, by flying or gliding, by swimming or floating, by moving logically through a virtual space, by burrowing through material, and the like. Locations in an environment or portions of an environment may be "traversed" or "explored" or "navigated" when a mobile devices moves in them.

"Environment" is a broad term and is to be given its ordinary and customary meaning to a person of ordinary skill in the art (i.e., it is not to be limited to a special or customized meaning) and includes, without limitation, individual rooms, multiple rooms, corridors, vehicle interiors, lawns, fields, patios, roofs, sidewalks, roads, swimming pools, floors, ceilings, walls, unenclosed and partially enclosed outdoor spaces, portions of the preceding, and the like.

"Surface" is a broad term and is to be given its ordinary and customary meaning to a person of ordinary skill in the art (i.e., it is not to be limited to a special or customized meaning) and includes, without limitation, that part of an environment which a mobile device navigates or attempts to navigate, such as a floor, wall, ceiling, ground, fence, interior, top, bottom, side, exterior, and the like. A surface need not be planar or substantially planar but may include, for example, the interior volume of an environment (such that navigating such a surface involves moving in that surface in three dimensions).

"Obstacle" is a broad term and is to be given its ordinary and customary meaning to a person of ordinary skill in the art (i.e., it is not to be limited to a special or customized meaning) and includes, without limitation, animals, people, furniture bases such as chair or table legs and couch bottoms, walls, trees, and other objects that prevent or significantly impede the movement of a mobile device along a surface.

This disclosure makes reference to signals being of the same "type" and having distinguishing characteristics or properties, such that they can be distinguished by an appropriate receiver or by other appropriately configured software or hardware. "Type" is a broad term and is to be given its ordinary and customary meaning to a person of ordinary skill in the art (i.e., it is not to be limited to a special or customized meaning) and includes, without limitation, categorizations of signals such that two or more signals in that categorization ("of that type") are sufficiently similar such that a "sensor" which can detect the presence of one can detect the presence of the other. For example, and without limitation, a signal type may be "light" "ultraviolet light", "infrared light", "sound" "ultrasonic waves", "radio", "Bluetooth", "UWB", "ZigBee", or "Wi-Fi". Two signals of the same "type" may both be detected by a single appropriate sensor. Such a sensor may be unable to distinguish between two signals of the same type even though it can detect them. However, some such sensors may detect differences between two signals of the same type. For example, two signals may both be "light signals" (i.e., their frequencies are such that they are within the range accepted by one of skill in the art as being of the type "light") but have different wavelengths, frequencies, or amplitudes. A second example is that two "wi-fi" signals may have different frequencies or intensities. Thus, two signals of the same type may have different values for one or more properties.

Certain sensors are able to detect not just the presence of signals of a particular type, but are also able to distinguish between signals of the same type that have different values for one or more properties. Such a sensor can thus detect the presence of each of two or more distinct signals of the same type (where "distinct" means having different values for some property detectable by the sensor in question). A single such sensor (or a single receiver with at least one such sensor), may detect not just the presence of the two or more signals of the same type, but may also detect values for the one or more of the one or more properties or characteristics that distinguish the two signals from each other. This is further illustrated below, however, the discussions herein are not meant to limit the types of signals or the properties or characteristics that may distinguish a signal of one type from a second signal of that type. Rather the discussion is intended to clarify what is meant by "sensor": a detector capable of detecting signals of a given type and, in certain embodiments, distinguishing between distinct signals of the same type.

A "receiver" may include one or more sensors, some or all of which may be of the same configuration (i.e., able to detect the same signal types and, in certain embodiments, distinguish signals of a given type based on the same properties). Within this description, one of skill in the art will still have a broad understanding of what a "sensor" and "receiver" are, and this description is not meant to limit or constrain that understanding.

Components of an Example Embodiment

FIG. 1 illustrates elements of an example embodiment of a mobile device 100 configured to detect obstacles and to localize using a single receiver 103. Embodiments may be configured with some or all of the described modules, and may be configured with additional modules, including additional receivers.

Illustrated mobile device 100 is configured with a mobile device controller 101, which includes a localization module 106 and an obstacle detection module 107. The mobile device controller 101 is in communication with a drive module 102. The drive module 102 is in directed or indirect communication with a drive mechanism 110, which may be treads, wheels, fins, exhausts, or other means of motion or combination of such means. The communication path between the drive module 102 and drive mechanism 110 may include one or more motors, gears, bands, intermediate controllers and microcontrollers, and/or other components used in sensing, controlling, and/or causing movement of the mobile device.

The mobile device controller 101 may include a computing device, such as a microprocessor-based unit, that contributes to controlling the behavior of the mobile device. For example, mobile device controller 101 may include an ARM7 processor, configured with 256K of flash ROM and 64K of RAM. Other embodiments may feature more or less powerful processors with more or less volatile and/or non-volatile storage. Some embodiments may have multiple processors. Some embodiments may have dedicated processors and controllers instead of or in addition to particularly configured general purpose processors.

The mobile device controller 101 may send movement commands to the drive module 102, which actuates the mobile device's locomotion. In an example embodiment, high level navigation instructions are sent from the mobile device controller 101 to the drive module 102. Such instruction might indicate, for example, that the drive module 102 should take the mobile device 100 'across the room', should take the mobile device 100 to a particular location, or should perform a certain task (e.g., sweep or cover some or all of a room). Optionally in addition or instead, lower level instructions are sent, such as step-by-step directions for navigating a room (e.g., move 0.3 meters forward, rotate 45 degrees, mover 1.4 meters forward, etc.). Some instructions may be modifiers to existing instructions (e.g., to speed up or slow down (perhaps to a particular rate, by a particular amount, or by a particular percentage, for example) or an instruction to turn an additional number of degrees from a current orientation). Optionally, both data and instructions are sent. Such data may include information about detected obstacles and the current pose (or partial pose) of the mobile device, and the instructions may be absolute (e.g., moving to a particular location or performing a particular task). relative to the data (e.g., moving 3 meters from the current location along the current orientation, or change orientation to point away from detected obstacle), or both.

Optionally, localization and obstacle detection data is not sent to the drive module 102 by the mobile device controller 101, but is instead available in a storage location for the drive module 102 to inspect. The drive module 102 may also provide information to the mobile device controller 101, including, for example, information from physical sensors monitoring the location of the mobile device, the presence of obstacles, and/or conditions in the environment. The drive module 102 may also provide information about the current drive properties of the mobile device, such as its heading, speed (scalar velocity), and/or acceleration.

Mobile device controller 101 is optionally in communication with the example off-board signal module 105. Off-board signal module 105 comprises one or more signal sources, such as light sources (visible, infrared, or ultraviolet), sound sources, or radio sources. The one or more signals from the off-board signal module 105 is preferably any type of signal that is reflected by objects in the mobile device's environment and by the boundaries of that environment or that has known or determinable dissipation properties such that it can be used for localization and object detection as described herein or as would be apparent to a skilled artisan in light of this disclosure. In an example embodiment, the off-board signal module 105 includes one or more stand-alone light projection modules that are stationary in the environment and project collimated beams of light onto one or more surfaces that are visible by the mobile device 100, such as a room ceiling, when the mobile device 100 is in the environment of the surfaces. The light projection modules may include LEDs (light emitting diodes) which emit infrared light as the signals, although other light emissive devices may be used in addition or instead. The light in the one or more beams may have respective distinguished characteristics. For example, the one or more beams may be modulated (e.g., wherein the light is amplitude modulated at pre-set frequencies and/or frequency modulated). Optionally, in addition or instead of the light projection modules, the off-board signal module 105 includes one or more radio frequency transmitters, such as one or more Bluetooth (over IEEE 802.15.1), ultra-wideband (UWB, over IEEE 802.15.3), ZigBee (over IEEE 802.15.4), and/or Wi-Fi (over IEEE 802.11) transceivers for short or medium range wireless communications.

In some embodiments, the frequencies (or amplitudes, or wavelengths, or other distinguishing signal properties) are not pre-set, but are established by, for example, communication between the off-board signal module 105 and the mobile device 100 (e.g., via the mobile device controller 101). In some embodiments, a component on the mobile device 100, such as the mobile device controller 101, indicates the value or values of the signal properties that the off-board signal module 105 should use. In some embodiments, the off-board signal module 105 indicates to the mobile device 100 the values and/or signal properties used.

Mobile device 100 may be configured to cause the off-board signal module 105 to power on, power off, or otherwise change its operational status. For example, control signals may be sent, optionally via a special purpose carrier signal (e.g., a infrared or RF signal) such as one caused to be sent from the mobile device 100 by the mobile device controller 101, in a signal from the on-board signal module 104, or otherwise. A receiver, optionally including passive or low-power receivers, associated with the off-board signal module 105 receives the signal and responds as appropriate, such as by activating or deactivating some or all of the functionality of the off-board signal module 105.

The illustrated example mobile device 100 also comprises an on-board signal module 104, which may be in communication with the mobile device controller 101. The on-board signal module 104 projects one or more signals into the environment. In some embodiments, these signals are directed towards known, anticipated, or likely obstacles in the environment. In an example embodiment, the signals from the on-board signal module 104 are of the same type as those from the off-board signal module 105 (although in other embodiments the signals may be of different types).

For example, both modules 104, 105 may project radio waves, or both may project infrared light waves. In some such embodiments, the same properties are used by the on-board signal module 104 and the off-board signal module 105 to differentiate multiple such signals. For example, both modules 104, 105 might deploy frequency modulation, both might deploy amplitude modulation, etc. In an example embodiment, signals from the on-board signal module 104 can be distinguished from signals from the off-board signal module 105. In a similar fashion to the way the value or values of the distinguishing signal property (and/or the signal property or properties to be used to identify or distinguish signals) of the off-board signal module 105 can be established in a variety of ways, including but not limited to being pre-set, established via negotiation between the mobile device 100 and the off-board signal module 105, or determined by one and communicated to the other, so too can those values and/or properties for the on-board signal module 105 be established or communicated. In some instances, the on-board signal module 104 and the off-board signal module 105 may communicate with each other directly or through an intermediary such as the mobile device controller 101 to establish mutually acceptable (e.g., distinct) signal property values to use. Such values may be specified as ranges.

As with the off-board signal module 105, the on-board signal module 104 may emit light such as infrared light and include light emitters such as LEDs optionally combined with an optical collimation system to control the shape and the direction (e.g., projection angle) of the light emission. The on-board signal module 104 may, in addition or instead, broadcast radio frequency (RF) signals. On-board signal module 104 may drive current through each LED so that the light emitted is modulated. In an example embodiment, each light beam is modulated at a unique frequency. Although on-board light module 104 may have its own internal logic and control components, in some embodiments mobile device controller 101 controls its operation, including activating each light beam (or emitted signal) and setting the frequency of oscillation for each beam (or appropriate signal property for each signal).

LED light emitters comprising the off-board signal module 105 and on-board signal module 104 might each emit distinct signals having the same or substantially similar wavelength (e.g., an infrared wavelength) and being modulated at a frequency in the range within 2 kilohertz to 5 kilohertz. In an example embodiment, the distinction among the signals is that each is in one of a certain number (e.g., 20) of frequency bands within that range. In some such configurations, the frequencies of other signals, including those emitted by off-board signal module 105, can be adjusted to avoid conflicts with the new frequency channels used by the on-board signal module 104.

In some embodiments, some or all of the on-board signal modules 104 and/or some or all of the off-board signal modules 105 can be configured to emit signals at lower or higher intensities (i.e., power levels). For example, the on-board module 104 can be controlled to reduce the power level of the signal when the mobile device is approaching a large reflecting surface (such as an obstacle) in order to avoid saturating the receiver 103. The off-board signal module 105 can be controlled to reduce its emission power in environments such as rooms with low ceilings and to increase it in environments such as rooms with high (e.g., cathedral) ceilings. Again, this might be done to avoid saturating the receiver 103 while preserving the ability to localize using the emissions of the off-board signal module 105. This ability to modify emission strength can lead to a more efficient power consumption by the mobile device and/or the off-board signal module 105. This may be particularly relevant when one or both of the mobile device and the off-board signal module 105 are powered by batteries.

The illustrated example mobile device 100 further comprises a receiver 103. If the signal modules 104 and 105 are light emitting modules, then receiver 103 is preferably a light receiver including one or more light sensors (e.g., that outputs a voltage and/or current correlated to the intensity of the detected light). More generally, a receiver 103 may comprise one or more sensors, each sensor configured to detect at least a type of signal. A receiver 103 may comprise sensors of a single type (e.g., multiple sensors configured to detect the presence of the same signal type in the same fashion) or sensors of different types (e.g., configured to detect the presence of the same signal type in different fashion or configured to detect the presence of different types of signals).

A receiver 103 may be configured to collect or receive all signals in the environment of the type emitted by the signal modules 104 and 105. A receiver 103 may separate out and measure the intensity (or other signal property) and direction (e.g., the incident angle relative to a normal of the receiver 103 and a direction for that angle relative to the orientation of the mobile device 100; other references for angles and direction may be used) of the contributions of each signal source, including the on-board signal module 104 and the off-board signal module 105. The one or more sensors that comprise the receiver 103 may be able to distinguish among signals of the same type by, for example, detecting one or more distinguishing signal properties. In some embodiments, the receiver 103, and not the one or more sensors which comprise the receiver 103, is able to distinguish among signals of the same type. In some such embodiments, distinguishing among signals of the same type may be accomplished through the use of logic which operates on the output of sensors (e.g., where the sensors convert the detected signal to an analog signal, which is then converted, via an analog-to-digital convertor, to a digital signal) which cannot individually distinguish among signals of the same type.

The signal property used to distinguish the signals may be one that is substantially unmodified as the signals reflect through the environment. Certain embodiments can function even in the presence of interfering signals in the environment having that property, where the signals are from a source other than one of the signal modules. An embodiment may account for the presence of such an interfering signal by, for example, surveying the background signals when it knows that neither of the modules is emitting an interfering signal (e.g., by instructing the module emitters to be switched off and/or in response to a signal from the modules indicating that the modules emitters are switched off) and factoring/filtering out the presence of that background signal when processing the signals collected by the receiver 103.

Receiver 103 may comprise analog and/or digital hardware configured to perform signal demodulation, for example, if the projected signals are amplitude or frequency modulated signals.

Mobile device 100 also includes a localization module 106 and an obstacle detection module 107. As previously discussed, the localization module 106 and obstacle detection module 107 may be submodules of the mobile device controller 101 (as shown), or may be implemented independently.

Example Interaction Among Components of an Example Embodiment

Figure 2:
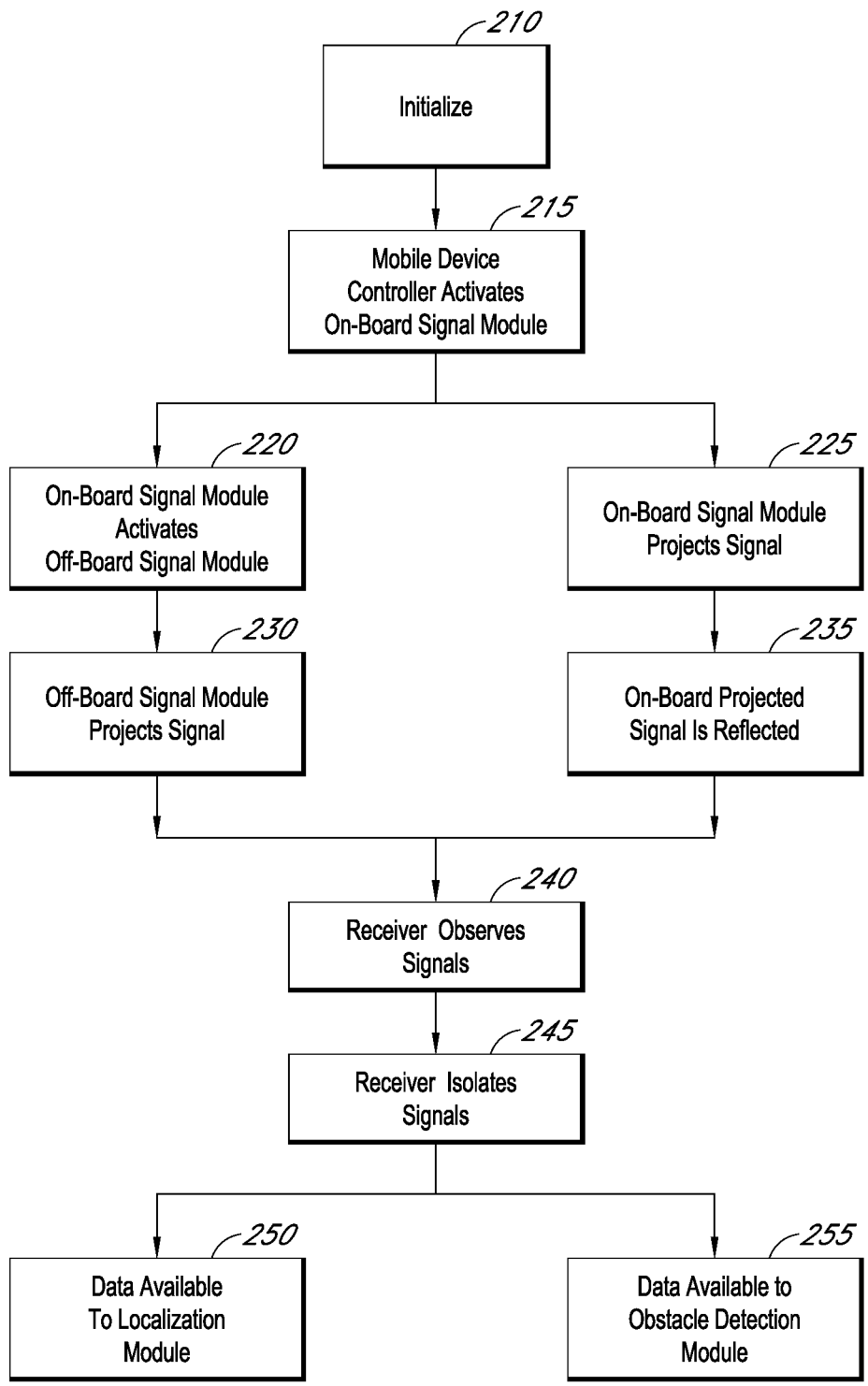
FIG. 2 illustrates an example process by which a system such as that illustrated in FIG. 1 may operate.

FIG. 2 illustrates an example process illustrating an interaction among components of a system such as that illustrated in FIG. 1. During an initialization state 210, the mobile device 100 may be powered on, its various components activated and systems checked, and the like. At state 215, the mobile device controller 101 activates the on-board signal module 104. This activation 215 may involve bidirectional or unidirectional communication, as discussed above. In some embodiments, the on-board signal module 104 may be activated manually, as part of the initialization state 210, or otherwise. The activated on-board signal module 104 activates the off-board signal module 105 at state 220, and begins projecting its signal into the environment at 225. Preferably, these signals "illuminate" or hit portions of the environment and, at state 235, are reflected by those portions of the environment (e.g., obstacles and walls). The activated off-board signal module 105 projects its signal at state 230.

The off-board signal module 105, like the on-board signal module 104, may be activated in a variety of other ways, including but not limited to manually (by a user) or directly, by the mobile device controller 101, and/or as part of the initialization state 210. Activation, at state 220, of the off-board signal module 105 may involve communication among or between the mobile device controller 101, the on-board signal module 104, the off-board signal module 105, other modules or submodules of the mobile device 100, and/or a user or external control system.

On-board components, such as the mobile device controller 101 and the on-board signal module 104, may communicate with off-board components such as the off-board signal module 105 or a remote control via the same type of signal used for localization and object detection. In some such embodiments, such a signal has a particular signal property (e.g., is at a particular frequency or within a particular wavelength range) to identify the signal. Information may be encoded in such a signal using, for example, an electro-optic modulator to modulate the phase, frequency, amplitude, and/or polarization of the light beam. In some embodiments, communications may be via means other than the signal types (e.g., infrared light) used for localization and object detection. For example, RF (radio frequency), ultrasonic, or other wireless or even wired communications may be used to send messages.

Reflections of the signals emitted by the two (or more) signal modules are observed by the receiver 103 at state 240. Receiver 103 or associated components isolate or distinguish the one or more localization signals from the one or more object detection signals at state 245. At state 250, information about the observed localization signal or signals is made available to localization module 106, and at state 255 information about the observed object detection signal or signals is made available to object detection module 107. In an example embodiment, information about the observed object detection signal or signals is made available to the localization module 106 so that the localization module 106 may, for example, estimate and correct environmental biases which affect the localization process.

The localization module 106 may use any of a number of processes for localizing a mobile object based on the observations of signals in an environment. For example, embodiments may use the NorthStar localization system disclosed in U.S. Pat. No. 7,720,554, filed on Mar. 25, 2005 and/or the systems and methods disclosed in U.S. patent application Ser. No. 12/940,937, filed on Nov. 5, 2010, both of which are incorporated herein by reference in their entirety.

First Example Configurations Using Direct Reflection

Figure 3:
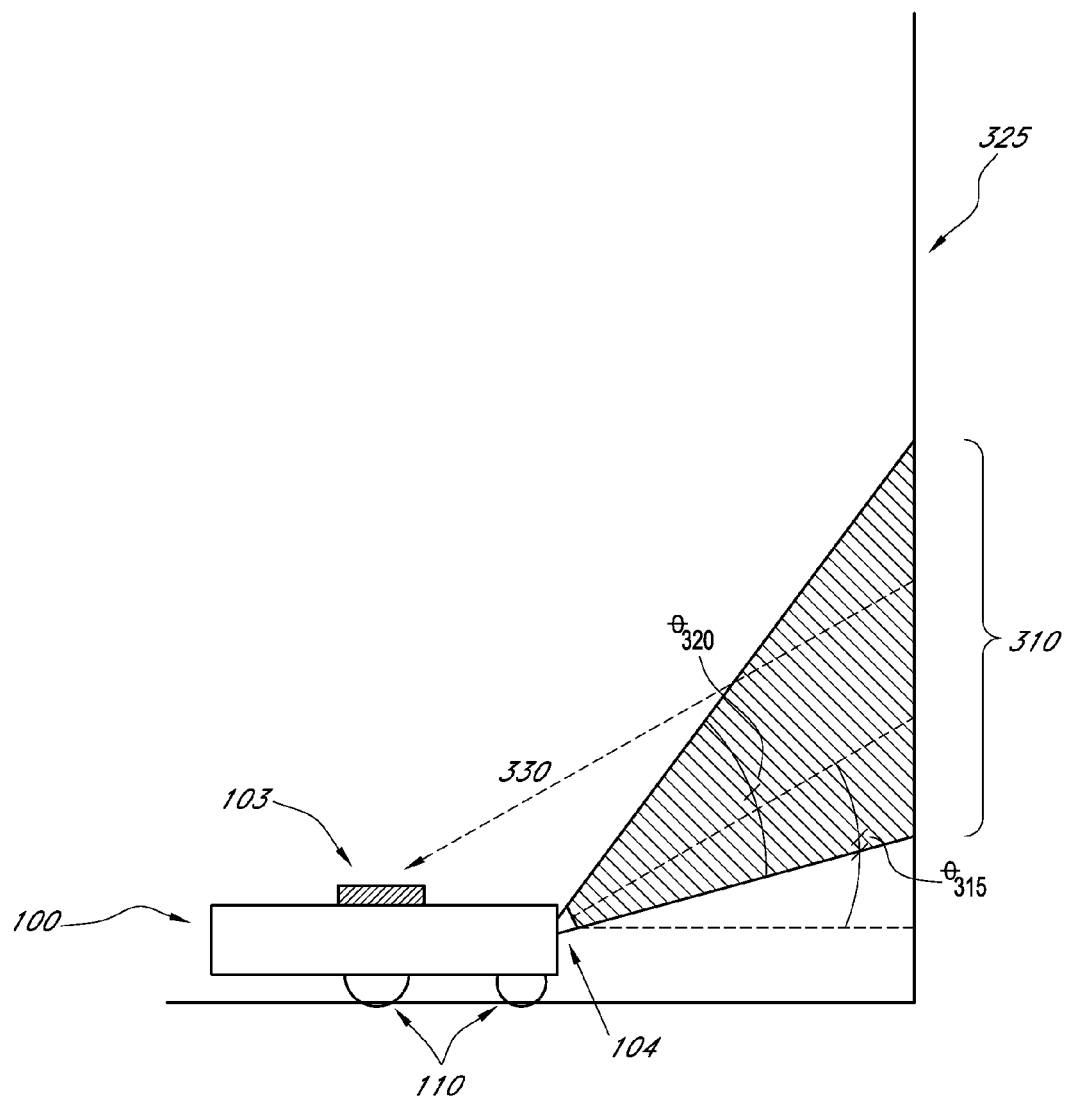
FIG. 3 illustrates an example embodiment of a mobile object configured to detect an obstacle based on signals reflected (or not reflected) by the obstacle.

FIG. 3 illustrates a configuration referred to as a "Direct Reflection" configuration. The figure illustrates a mobile device 100 equipped with both a receiver 103 and an on-board signal module 104. In the illustrated example, the on-board signal module 104 is a light projecting module consisting of one or more LED emitters mounted on the front of the mobile device and pointing so that the primary axis 335 of the cone of emission 310 of the emitted signal is approximately 45 degrees above the horizontal (although other angles $\theta_{315}$ may be used). The orientation $\theta_{315}$ may range from −90 to 90 degrees, but is preferably at an angle of approximately −5 to 60 degrees, so that the cone of emission 310 encompasses obstacles that have at least a portion at the general level of the mobile device 100 (and may, therefore, possibly impede the movement of the mobile device 100) and is such that the mobile device 100 can potentially distinguish tall obstacles (such as walls) from shorter ones (such as chairs and sofas). In an example embodiment, some or all of the LEDs have a wide angle of emission such that the total angle of emission $\theta_{320}$ is larger than 60 degrees in all directions.

In operation, when such a mobile device 100 approaches an object, such as the wall 325, the light emitted by the on-board signal module 104 is reflected by the object and scattered in all directions, including in the direction of the receiver 103. The receiver 103 measures the intensity and the direction (which may include a measure of incident angle) of the reflected light 330 and sends the information to the obstacle detection module 107, or otherwise makes it available to that module 107. The above description applies equally well if the signal is, for example, sound, or any other signal that is suitably reflected by an obstacle such as wall 325.

An obstacle detection module 107 uses this information to determine the proximity of the obstacle 325. In an example embodiment, the obstacle detection module 107 compares the received intensity with a pre-set threshold value and if the received intensity is larger than the threshold value, it decides that an obstacle is present in front of the robot.

In another embodiment, the obstacle detection module 107 buffers the last N readings (where N is 2 or more, preferably 4, and may be in the tens (e.g., 10, 25, 50, 75), hundreds (e.g., 100, 500, 750), thousands (e.g., 1000, 5000, 7500), or larger). This buffered information may be combined with information about the location or pose of the mobile device at the time some or all of the buffered readings were observed (such as may be obtained from odometry devices and/or from the localization module 106) and/or information about the path the mobile device has followed, including the distance and direction of its movement, during some or all of the time the buffered readings were observed. Such information may be made available by the mobile device controller 101 or obtained from data storage on or off the mobile device, for example.

The buffered information can be combined with the odometry and/or other dead reckoning information (indicating a distance traversed from a previous position) to compute a derivative of the received intensity with respect to the distance travelled. The obstacle detection module 107 may then compare the derivative value with a pre-set threshold. If the derivative value is above such a threshold then it may detect that an obstacle is present in front of (or in the current path of) the mobile device.

Observations based on direct reflection similar to those described above may be combined with prior knowledge about the nature of the obstacles (e.g., their reflective properties, their locations, their sizes) to improve the results of the obstacle detection module 107. Prior knowledge may be sourced from predetermined information about preplaced objects (e.g., marker objects with known reflective properties at known locations), information from physical sensors, retained data from prior observations of the environment, and the like.

Example Configurations Using Coincident Signals

Figure 4:
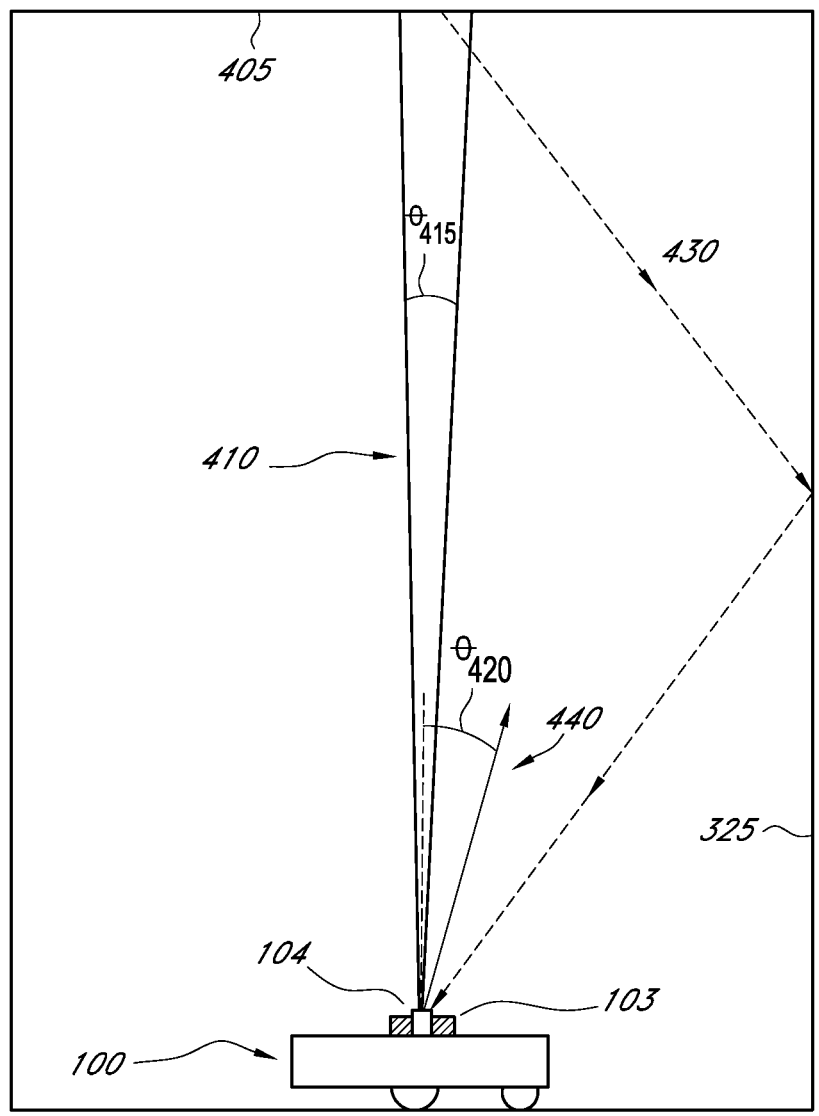
FIG. 4 illustrates an example embodiment of a mobile object configured to detect an obstacle based on the obstacle's reflection (or not) of a signal directed towards a ceiling.

FIG. 4 illustrates a configuration referred to as a "coincident" configuration. The figure illustrates an example mobile device 100 equipped with a receiver 103 and an on-board signal module 104 consisting of one or more LED emitters pointing in the vertical direction and with a highly collimated emission beam 410 (total emission angle $\theta_{415}$ optionally approximately 10 degrees or less, such as 7.5 or 5 degrees or less, but it may be greater, such as less than 15 degrees or less than 20 or 25 degrees). The on-board signal module 104 is located in close proximity to the receiver 103 so that the distance between them is preferably 100 times smaller than the height of the ceiling 405. For example, in a room with an 8 foot ceiling, the distance may be approximately less than 1 inch, such as 0.75, 0.5, or 0.25 inches or less. Greater distances, such as 1.5, 2, 3, 4, or 5 or more inches may be used in some embodiments. Holding other factors constant, generally the more distant the receiver 103 is from signal module 104, the less accurate the results of the obstacle detection module 107.

One such embodiment includes a receiver 103 that integrates the signal distribution of some or all the on-board signal modules over a subset or the entirety of the field of view of the receiver 103 and computes the direction of the center of such signal distribution 440. For example, it may calculate a median, mean, or other weighted measure to obtain a measure of an incident angle and a source direction for the distribution.

Signals (e.g., light) emitted by on-board signal module 104 are reflected off one or more surfaces, such as the ceiling 405, and are scattered in multiple directions. The light that is collected by the receiver 103 is a combination of contributions: light that is reflected by the ceiling 405 directly towards the receiver 103 ("first bounce" light) and light that has undergone two or more reflections (for example from the ceiling 405 to the wall 325 to the receiver 103) ("multi-path" light, such as light 430 in FIG. 4). These contributions are additive in nature. A receiver 103 may not be able to disambiguate between first bounce light and multi-path light, but may be configured to instead perceive a single incoming light that averages or otherwise integrates first bounce light and multi-path light.

The distance between the on-board signal module 104 and the receiver 103 is typically on the order of 1% (although it may be much less or as much as 2, 3, 5, or 10 percent) of the distance from the receiver 103 to the ceiling 405. An embodiment treats the direction of the mean of the distribution of the first bounce light as constant or substantially constant and independent or substantially independent of the ceiling height. Further, an embodiment treats such direction as perpendicular to the surface (i.e., the current plane of travel of the mobile device 100) and in the center of the field of view of the receiver 103.

Light from higher order bounces (multi-path light) is additive and in most cases the angle to the mean of the distribution of multi-path light is not perpendicular to the surface (because the location of reflecting surfaces around the mobile device 100 is typically not radially symmetric).

In the case illustrated in FIG. 4, the mobile device 100 is approaching a wall 325. As the mobile device 100 gets closer to the wall 325, the amount of light received from the second bounce 430 from the ceiling 405 to the wall 325 and on to the receiver 103 increases and biases the measure of the direction (including angle of incidence, for example) of the mean of the total light 440 collected by the receiver 103 in the direction of the wall 325.

The elevation angle $\theta_{420}$ indicated in FIG. 4 is the deviation of the measured direction (incident angle) from the vertical axis due to the presence of the wall 325. An obstacle detection module 107 can use the value of angle $\theta_{420}$ in combination with the intensity of the received light to calculate an estimate of the proximity of an obstacle.

In an example embodiment, the obstacle detection module 107 compares a given reading of elevation angle $\theta_{420}$ with a pre-set threshold and if the angle is larger than the pre-set threshold it decides that an obstacle is present in the direction indicated by the azimuth angle. (the measure of the direction of the mean of the light distribution in 3D consists of the elevation angle $\theta_{420}$ and an azimuth angle not shown in FIG. 4). In other words, a signal detected by the receiver may have two aspects to its "direction" property: an incident angle that may be defined relative to a normal of the receiver or relative to a plane of the receiver, for example, and an azimuth angle that may be defined relative to a plan of travel of the mobile device, for example. Two such measures can define the "direction" of an object in a three dimensional space relative the mobile device. A third measure, such as intensity, can be used to obtain a measure of the object's distance from the mobile device, thereby fully describing the object's location in an environment.

Figure 5:
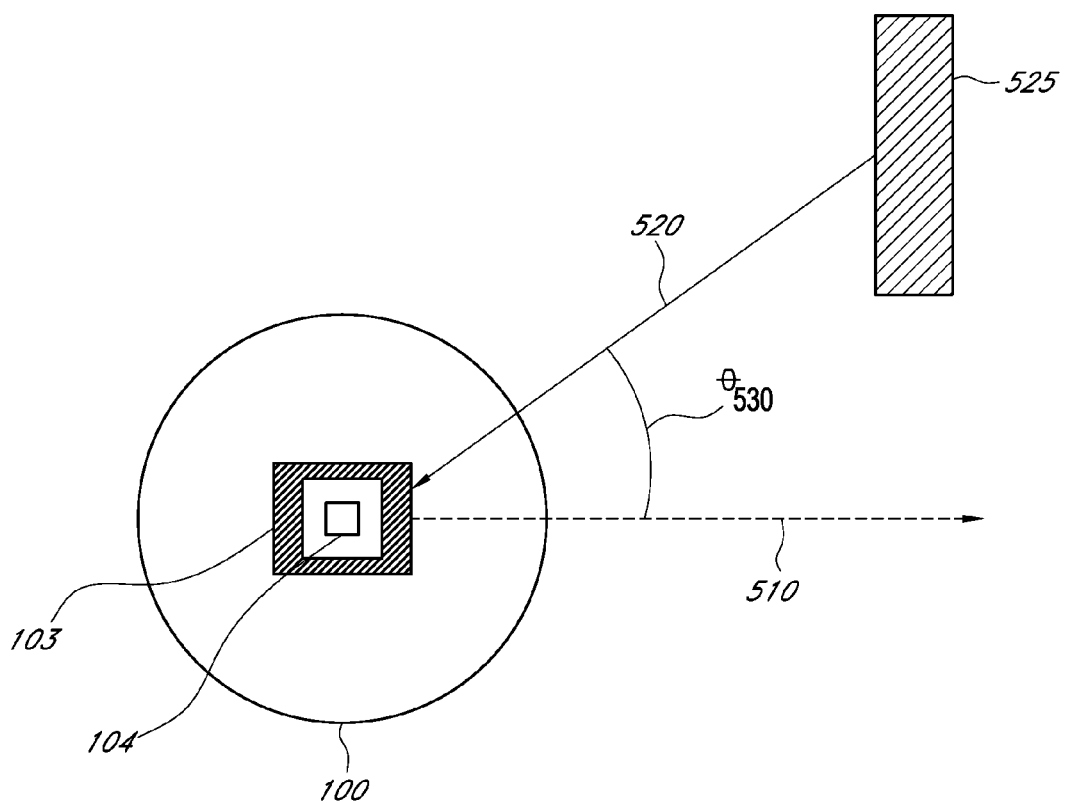
FIG. 5 illustrates an embodiment, such as that of FIG. 4, from a top-down perspective, illustrating determining an azimuth to an obstacle.

FIG. 5 is a top down view of a scene similar to that depicted in FIG. 4. The illustrated potential obstacle is a bookcase 525, instead of a wall 325. Mobile device 100 is moving in heading or orientation 510. Line 520 is the projection of the mean of the total light 440 in the direction of the bookcase 525, as described above. The azimuth $\theta_{530}$ is the angle between that projection 520 and the current heading 510 of the mobile device 100. In other embodiments, the azimuth may be measured from a reference orientation, such as a logical or absolute north.

A coincident configuration can also be employed for reducing bias caused by multi-path light when some embodiments determine the pose or location of a mobile device, such as during localization. As described in U.S. Pat. No. 7,720,554, some embodiments may compute the coordinates of the reflections of the light (or other signal) emitted by one or more off-board signal modules 105. In some such embodiments, the localization module 106 optionally employs a triangulation operation to derive the location of the mobile device 100 from those coordinates. In the presence of multi-path and other secondary reflections, those coordinates are biased towards the source of the reflections.

Information about the bias in the coordinates measured for the light spots projected by the on-board signal modules 104 ("on-board spots") can be used to estimate and remove the bias in the coordinates calculated for the light spots projected by the off-board signal modules 105 ("off-board spots"). Denoting by $(x_l, y_l, m_l)$ the 2-dimensional position and the magnitude of the on-board spot reported by the receiver 103 to the localization module 106 and by $(x_r, y_r, m_r)$ the 2-dimensional position and the magnitude of one of a plurality of off-board spots, the typical effect of multi-path light is to shift the reported coordinates of light spots towards large reflective surfaces proportionally to the size of such surfaces, their proximity, and their reflectivity properties. Assuming that the on-board spot position reported in the absence of multi-path was $(x_{l0}, y_{l0}, m_{l0})$, the bias $(d_{xl}, d_{yl})$ caused by multi-path on the on-board spot is calculated as:

$$d_{xl} = x_l - x_{l0}$$

$$d_{yl} = y_l - y_{l0}$$

The first order effect of multi-path on the off-board spot coordinates is a bias $(d_{xr}, d_{yr})$, which can be modeled as a function of $d_{xl}, d_{yl}, x_r, y_r, m_r$.

$$(d_{xr}, d_{yr}) = F(d_{xl}, d_{yl}, x_r, y_r, m_r)$$

In an example embodiment, the bias in the off-board spot coordinates is a scaled version of the bias measured for the on-board spot coordinates, as expressed in the following equation:

$$(d_{xr}, d_{yr}) = (d_{xl}, d_{yl}) * m_{r0}/m_{l0}$$

Where $m_{r0}$ is the magnitude of the off-board spot measured when the mobile device 100 is located directly under the off-board spot and $m_{l0}$ is the magnitude of the on-board spot measured in the absence of multipath (for example, when the mobile device 100 is located sufficiently far from any obstacles).

Different mathematical models for the function F may be used in addition to or in place of the model discussed above.

Example Configurations Using Offsets

Figure 6:
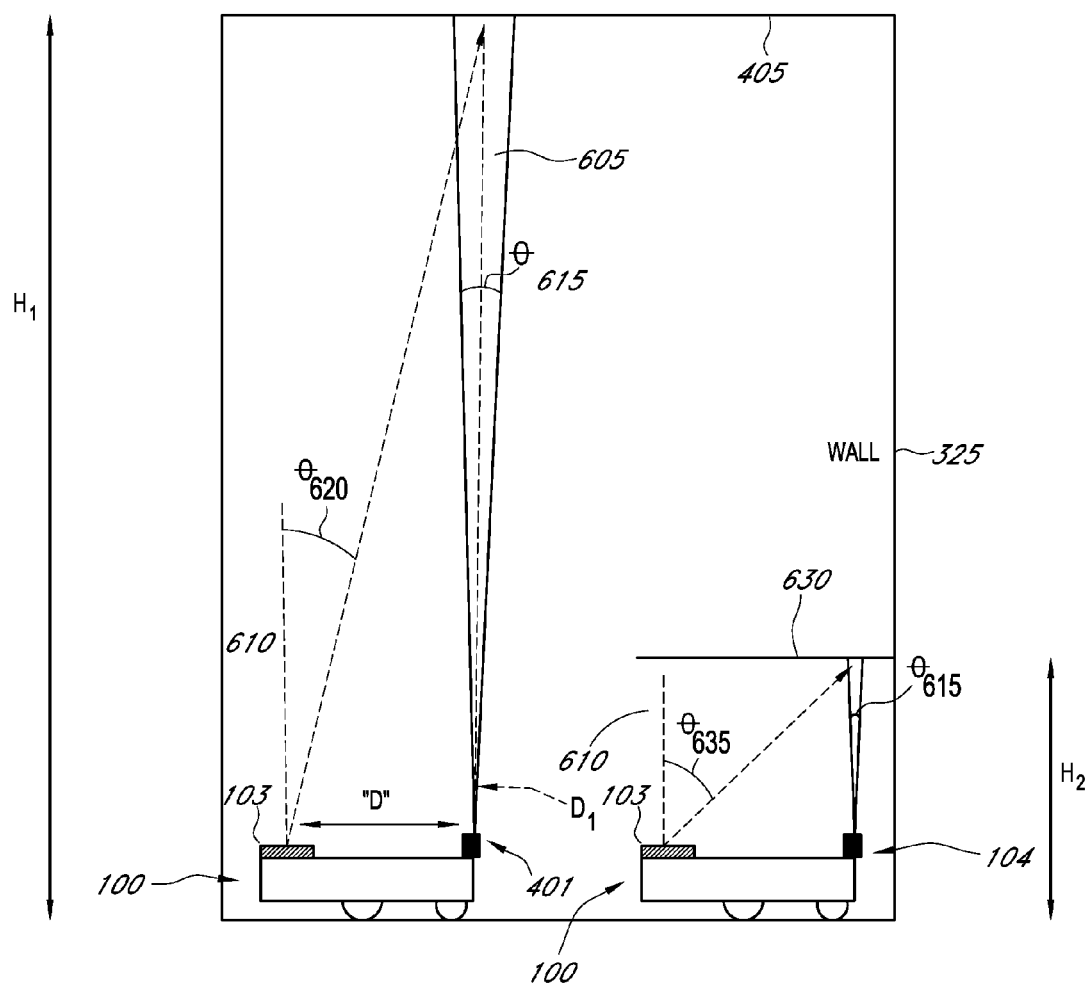
FIG. 6 illustrates an example embodiment of a mobile object configured to detect an obstacle based on the height or presence of an overhead object and that object's reflection (or not) of a signal directed towards it.

FIG. 6 illustrates an example configuration referred to as the "offset" configuration. An embodiment in this configuration may include an on-board signal module 104 projecting a substantially collimated signal beam as disclosed in the coincident configuration. For example, emission angle $\theta_{615}$ is optionally approximately 10 degrees or less, such as 7.5 or 5 degrees or less, but it may be greater, such as less than 15 degrees or less than 20 or 25 degrees; and the signal may be oriented perpendicular or substantially perpendicular to the surface (e.g., perpendicular to a plane in which the mobile device 100 moves) or substantially in the likely direction of any overhang or ceiling. Narrower emission angles may be more effective on relatively smooth ceilings or those with few obstacles (e.g., fans or lamps), while those with wider angles (e.g., approximately 10 degrees or more) may be more effective on uneven ceilings or those with descending or recessed fixtures. The angle of emission may be adapted to a particular environment. Without loss of generality, the on-board signal module 104 in this example includes LED emitters.

As illustrated, the on-board signal module 104 (e.g., emitters) are separated a distance D from the optical center of the receiver 103. In an example embodiment, D is approximately H/20 where H is the ceiling height. In another embodiment, D is approximately H/10. In yet another embodiment, D is approximately H/30. In embodiments intended for use in environments with ceiling heights of approximately 8-15 feet, D may preferably be in the range of 4 inches to 2 feet, including 6 inches, 8 inches, 10 inches, 1 foot, and 1.5 feet, although it may be greater or larger.

When the light (or other signal) from the on-board signal module 104 reflects off of a relatively distant surface, such as a ceiling 405, the measured direction of the mean of the light distribution approaches the direction of the optical axis 605 of the on-board signal module 104. Similarly, a consolidated measure of the incident angle relative to a normal of the receiver 103 (assuming the receiver 103 and on-board signal module 104 are substantially coplanar) of a signal from the on-board signal module 104 approaches a minimum value (the minimum value depends on the distance between the receiver 103 and the on-board signal module 104 and on the height of the ceiling). In FIG. 6, angle $\theta_{620}$ indicates the difference between the optical axis 610 of the receiver 103 and the measured signal spot direction when the mobile device 100 has an unobstructed view of the ceiling 405 (e.g., there are direct signal paths from the on-board signal module 104 and the receiver 103 to the ceiling 405). When the mobile device is located under an object 630, such as a table or a chair, the light (or other signal) reflects off of the bottom surface of the object 630, increasing the incident angle between the optical axis 610 of the receiver 103 and the measured signal spot direction (or a consolidated measure of the signals received by the receiver 103). The difference between the optical axis 610 of the receiver 103 and the measured signal spot direction approaches 90 degrees as the height of the object 630 approaches the height of the receiver 103. In FIG. 6, angle $\theta_{635}$ indicates the angle between the optical axis 610 of the receiver 103 and the measured spot direction when under an over-hanging object 630. It also represents a measure of the incident angle of a signal reflected from the over-handing object 630 to the receiver 103. Notice that $\theta_{635}$ is greater than $\theta_{615}$.

The values of the intensity and direction (e.g., azimuth and elevation) of the reflected light (or other signal) are sent to (or otherwise made available to) the obstacle detection module 107. It may compare each elevation reading with a preset threshold and if the angle is larger than the threshold, conclude that the mobile device has driven under an overhanging object. The mobile device controller 101 may, for example, use this information to adjust the speed, orientation, or other aspect or behavior of the mobile device 100, based on heuristics that indicate an obstacle (such as legs (e.g., human, chair, or table) or a wall (e.g., because furniture is often near a wall) is likely present An obstacle detection module 107 may buffer the last N elevation readings, where N is as described above, and combines this information with odometry information, also as described above, to compute a derivative of the received elevation with respect to the distance travelled. Such an obstacle detection module 107 may then compare the derivative value with a preset threshold. If the derivative value is above such threshold it may decide that an obstacle is present near the mobile device (because the mobile device is below a low 'ceiling').

The observations based on an offset configuration as described above may be combined with prior knowledge about the nature of the obstacles in the environment (e.g., their reflective properties, their locations, their sizes, their structure) to improve the results of the obstacle detection module 107.

Further Example Applications and Implementations of Obstacle Detection

Mobile devices using one or more of the above described approaches, or variations thereof that would be apparent to a skilled artisan in light of this disclosure, may advantageously adjust their navigational routines or other behavior in response to the detection or predicted presence of an obstacle.

An example embodiment may cause the mobile to device to continue on an existing navigational plan or route, but to proceed at a slower speed when the obstacle detection module 107 indicates the likely presence of an obstacle. Another embodiment (if the embodiment is one in which the heading of a likely obstacle can be determined or predicted) may change the navigational plan by changing the route so as to avoid the obstacle or perhaps to approach it more squarely or from another desired angle. An embodiment may function in this way if, for example, it performs a task such as sweeping or dusting that is better performed when it travels in a particular orientation or heading relative to an obstacle or when a particular portion of the embodiment is proximate or touching an obstacle.

Yet another embodiment may change its functional behavior. For example, an embodiment may turn on a visible light projector when it detects it is under another object, perhaps to illuminate a presumably dark area for human observers, or perhaps as an example of a means (another is making sounds) by which it might alert animals and humans in the vicinity of its otherwise hidden presence. Still another embodiment may turn on more sensitive (e.g., more accurate or more precise) sensors or deploy obstacle specific functional apparatus (e.g., cleaners mounted on the sides or upper surface of the mobile device 100) if the obstacle detection module 107 indicates the presence of an obstacle. These sensors or functional apparatuses may otherwise be disabled or recessed to conserve power or for aesthetic reasons, for example.

Some embodiments may deploy multiple of the obstacle detection mechanisms disclosed herein at the same time. For example, an embodiment might have an on-board signal module 104 configured for direct reflection and a second on-board signal module 104 configured for coincident reflection. Reflections of the projected signals from both modules may be received by the same receiver 103.

Some embodiments may adaptively deploy one or more of the obstacle detection mechanisms disclosed herein. For example, an embodiment may optionally include an on-board signal module 107 which can adjust the degree of collimation of the signal projected, such as in response to signals from the mobile device controller 101 or based on its own logic. Another such embodiment optionally includes an on-board signal module 107 attached to the mobile device 100 in such a way that it can change location relative to the receiver 103, such as by being mounted on a mechanically controlled slider plate. The receiver 103 may be similarly configured. Various combinations of one or more obstacle detection types and one or more adjustable receivers 103 or on-board signal modules 107 may be included.

The systems and methods disclosed herein may be advantageously contrasted with systems and methods that involve imaging for obstacle detection. As disclosed, a receiver 103 and an obstacle detection module 107 are able to determine that an obstacle is likely present or that, based on the center of mass and optionally the intensity of reflected signals, an obstacle is likely present in a particular direction (e.g., azimuth and/or elevation) and at an estimated distance. The size and shape of the obstacle may not be readily obtained from the observed data in some embodiments. However, in some embodiments, the information that is obtained is sufficient to produce effective navigational and operational routines, without incurring the monetary, power, and computational expense associated with imagers.

Broadly Applicable

The systems and methods disclosed herein can be implemented in hardware, software, firmware, or a combination thereof. Software can include compute readable instructions stored in memory (e.g., non-transitory, tangible memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof.

While certain embodiments may be illustrated or discussed as having certain example components, additional, fewer, or different components may be used. Further, with respect to the processes discussed herein, various states may be performed in a different order or substantially in parallel, not all states are required to be reached, and fewer, additional, or different states may be utilized.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein.

What is claimed is:

1. A localization and obstacle detection system comprising:
   a first signal projector configured to project a first signal into an environment; and
   a robot comprising:
      a second signal projector configured to project a second signal into the environment;
      a first signal receiver configured to receive both the first signal and the second signal, wherein the first signal receiver comprises a single signal sensor used to receive both the first signal, used to determine a location of the robot, and the second signal, used to determine a presence of an obstacle;
      a localizer configured to determine a location of the robot in the environment based at least in part on the first signal received by the single signal sensor; and
      a detector configured to determine the presence of an obstacle in the environment based at least in part on the intensity and bearing of the second signal received by the single signal sensor and without touching the obstacle;
      wherein the second signal is distinct from the first signal in at least one characteristic;

wherein the robot is configured to move in the environment.

2. The system of claim 1, wherein the first signal and the second signal are in the light spectrum, and wherein the single signal sensor comprises a first single light sensor, the first single light sensor used to sense both;
the first signal, used to determine a location of the robot, and
the second signal, used to determine a presence of an obstacle.

3. The system of claim 1, wherein the detector is configured to determine the presence of an obstacle based at least in part on the received second signal indicating that the robot is under an object, wherein the object comprises the obstacle and the received second signal, projected by the second signal projector, is reflected from a bottom side of the object.

4. The system of claim 1, wherein the detector is configured to determine the presence of an obstacle based at least in part on:
the received second signal indicating that the robot is under an object, wherein the object comprises the obstacle, such that:
a first incident angle determined by the second signal as detected by the first signal receiver at a first time:
is above a first threshold, or
exceeds by a second threshold a second measured incident angle determined by the second signal as detected by the first signal receiver at a second time prior to the first time.

5. The system of claim 1, wherein the detector is configured to determine the presence of an obstacle based at least in part on the received second signal indicating that the robot is approaching the obstacle.

6. The system of claim 1, wherein:
the detector is configured to determine the presence of an obstacle based at least in part on the received second signal indicating that the robot is approaching the obstacle: and
the second signal projector is configured to project the second signal substantially in a direction in which the robot is configured to move when in operation on a surface.

7. The system of claim 1, wherein:
the detector is configured to determine the presence of an obstacle based at least in part on the received second signal indicating that the robot is approaching the obstacle; and,
the second signal projector is configured to project the second signal in a direction which is substantially orthogonal to a direction of movement of the robot in the environment.

8. The system of claim 1, wherein the detector is configured to determine the presence of an obstacle based at least in part on the received second signal indicating that the robot is approaching the obstacle, and
wherein the second signal projector and the first signal receiver are relatively positioned so that the detector determines the presence of an obstacle based at least in part on the analysis of reflections of the projected second signal received by the receiver,
said reflections having been reflected at least twice within the environment after being projected and before being received by the receiver.

9. The system of claim 1, wherein the detector is configured to determine the presence of an obstacle based at least in part on the received second signal indicating that the robot is approaching the obstacle, and
wherein the second signal projector and the first signal receiver are relatively positioned so that the detector determines the presence of an obstacle in the environment based at least in part on the analysis of direct reflections by the obstacle of the projected second signal received by the receiver.

10. The system of claim 1, wherein the detector is configured to determine the presence of an obstacle based at least in part on the received second signal indicating that the robot is approaching the obstacle, and,
wherein the second signal projector and the first signal receiver are relatively positioned so that the detector determines the presence of an obstacle based at least in part on the analysis of direct reflections by an object in the environment above the robot of the projected second signal received by the receiver.

11. The system of claim 1, wherein
the detector is configured to determine the presence of an obstacle based at least in part on the received second signal indicating that the robot is approaching the obstacle;
the second signal projector is configured to project the second signal in a direction which is substantially orthogonal to a direction of movement of the robot in the environment; and
the second signal is collimated.

12. The system of claim 1, wherein the localizer is further configured to use obstacle detection information from the detector to determine the location of the mobile device.

13. The system of claim 1, wherein the detector is configured to determine a presence of an overhanging obstacle having the potential to impede movement of the robot.

14. The system of claim 1, wherein the robot is further configured to transmit a signal configured to activate or deactivate at least a portion of the first signal projector's functionality.

15. The system of claim 1, wherein the robot is further configured to transmit a signal configured to change an operational status of the first signal projector.

16. A localization and obstacle detection method comprising:
receiving at a first receiver physically associated with a mobile object both a first signal, the first signal projected from a source other than the mobile object, and a second signal, the second signal projected from the mobile object, wherein the first receiver comprises a single sensor used to receive both the first signal, used to determine a location of the robot, and the second signal, used to determine a presence of an obstacle;
distinguishing the first received signal from the second received signal based on at least one signal characteristic that differs between the first received signal and the second received signal;
localizing the mobile object in an environment based at least in part on the first received signal received at the single sensor;
determining that the mobile object is proximate to an obstacle in the environment based at least in part on the second received signal received at the single sensor;
maintaining a space between the mobile object and the proximate obstacle in the environment,
wherein the first signal and the second signal are of the same signal type and have at least one different characteristic relative to each other.

17. The method of claim 16, wherein the first receiver consists essentially of one or more optical sensors configured to receive the same type of light signal, wherein the one or more optical sensors comprise a first single optical sensor, the first single optical sensor configured to sense both:

the first signal, used to determine a location of the robot, and the second signal, used to determine a presence of an obstacle.

18. The method of claim 16 wherein the mobile object has a heading of movement in the environment, the method further comprising modifying the heading based at least in part on the determined proximity of the mobile object to an obstacle in the environment detected using the first signal or the second signal, or both the first signal and the second signal.

19. The method of claim 16 wherein the mobile object has a velocity of movement in the environment, and the method further comprising modifying the velocity based at least in part on the determined proximity of the mobile object to an obstacle in the environment.

20. The method of claim 16, the method further comprising:

emitting the first signal from a stationary signal source spaced apart from the mobile object; and emitting the second signal from the mobile object.

21. The method of claim 16, wherein localizing is based at least in part on determining obstacle proximity.

22. The method of claim 16, wherein determining obstacle proximity is based at least in part on localizing.

23. The method of claim 16, the method further comprising determining a presence of an overhanging obstacle having the potential to impede movement of the mobile object.

24. The method of claim 16, the method further comprising transmitting from the mobile object a signal configured to activate or deactivate at least a portion of the projector not on the robot.

25. The method of claim 16, the method further comprising transmitting from the mobile object a signal configured to change an operational status of the projector not on the robot.

26. A mobile robot comprising:

a signal projector configured to project a first signal into an environment, the first signal being of a first signal type and having a first value for a signal property;

a first signal receiver configured to receive signals of the first signal type, including at least both the first signal and a second signal, the second signal projected from a projector not on the robot, wherein the first signal receiver comprises a single sensor used to receive both the first signal, used to determine a location of the robot, and the second signal, used to determine a presence of an obstacle;

wherein the second signal is of the first signal type and has a second value for the signal property, the second value different from the first value;

a localizer configured to determine a location of the robot in the environment based at least in part on the second signal received by the single sensor; and a detector configured to determine the presence of an obstacle in the environment based at least in part on the first signal received by the single sensor;

wherein the robot is configured to move in the environment.

27. The mobile robot of claim 26, wherein the detector is configured to determine a presence of an overhanging obstacle having the potential to impede movement of the mobile robot.

28. The mobile robot of claim 26, wherein the mobile robot is further configured to transmit a signal configured to activate or deactivate at least a portion of the first signal projector's functionality.

29. The mobile robot of claim 26, wherein the mobile robot is further configured to transmit a signal configured to change an operational status of the first signal projector.

30. The mobile robot of claim 26, wherein the single sensor comprises a single light sensor configured to sense both:

the first signal, used to determine a location of the robot, and the second signal, used to determine a presence of an obstacle.

* * * * *